United States Patent
Li

(10) Patent No.: US 9,977,907 B2
(45) Date of Patent: May 22, 2018

(54) ENCRYPTION PROCESSING METHOD AND DEVICE FOR APPLICATION, AND TERMINAL

(71) Applicant: ZTE Corporation, Shenzhen (CN)

(72) Inventor: Xipeng Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 279 days.

(21) Appl. No.: 14/781,252

(22) PCT Filed: Aug. 28, 2013

(86) PCT No.: PCT/CN2013/082466
§ 371 (c)(1),
(2) Date: Sep. 29, 2015

(87) PCT Pub. No.: WO2014/166193
PCT Pub. Date: Oct. 16, 2014

(65) Prior Publication Data
US 2016/0055339 A1    Feb. 25, 2016

(30) Foreign Application Priority Data

Apr. 7, 2013   (CN) .......................... 2013 1 0117667

(51) Int. Cl.
*G06F 11/30* (2006.01)
*G06F 21/60* (2013.01)
(Continued)

(52) U.S. Cl.
CPC ............ *G06F 21/602* (2013.01); *G06F 21/31* (2013.01); *G06F 21/6209* (2013.01);
(Continued)

(58) Field of Classification Search
CPC .... G06F 21/31; G06F 21/602; G06F 21/6209; H04L 9/0863; H04L 9/0866; H04L 63/0428
(Continued)

(56) References Cited

U.S. PATENT DOCUMENTS 9,276,748 B2 * 3/2016 Wang .................... H04W 12/02
9,516,019 B2 * 12/2016 Li .......................... G06F 21/123
(Continued)

FOREIGN PATENT DOCUMENTS

| CN | 101662765 A | 3/2010 |
|---|---|---|
| CN | 102098657 A | 6/2011 |

(Continued)

OTHER PUBLICATIONS

International Search Report for corresponding application PCT/CN2013/082466 filed Aug. 28, 2013; dated Jan. 9, 2014.
(Continued)

*Primary Examiner* — Samson Lemma
(74) *Attorney, Agent, or Firm* — Cantor Colburn LLP

(57) ABSTRACT

Provided are an encryption processing method and device for an application, and a terminal. In the method, a first application to be encrypted is acquired, wherein the first application to be encrypted is selected by a user of the terminal; the user is prompted to input first information; a first key is generated according to the first information; the first application is encrypted by using the first key and the first key is stored in the first application. The technical solution can encrypt an application.

8 Claims, 5 Drawing Sheets

(51) Int. Cl.
*G06F 21/62* (2013.01)
*H04L 9/08* (2006.01)
*H04L 29/06* (2006.01)
*G06F 21/31* (2013.01)

(52) U.S. Cl.
CPC .......... *H04L 9/0863* (2013.01); *H04L 9/0866* (2013.01); *H04L 63/0428* (2013.01)

(58) Field of Classification Search
USPC .......................................................... 713/189
See application file for complete search history.

(56) References Cited

U.S. PATENT DOCUMENTS

| | | | | |
|---|---|---|---|---|
| 2004/0103288 A1* | 5/2004 | Ziv | ..................... | G06F 12/1466 713/185 |
| 2010/0044444 A1 | 2/2010 | Jain | | |
| 2010/0250939 A1* | 9/2010 | Adams | ................ | G06F 11/1458 713/171 |
| 2012/0005474 A1* | 1/2012 | Bourret | ................... | G06F 21/34 713/150 |
| 2013/0073672 A1* | 3/2013 | Ayed | ..................... | H04L 67/306 709/217 |
| 2014/0373168 A1* | 12/2014 | Chen | ....................... | G06F 21/60 726/26 |

FOREIGN PATENT DOCUMENTS

| | | | |
|---|---|---|---|
| CN | 102647712 A | 8/2012 | |
| CN | 102938032 A | 2/2013 | |
| WO | WO 2013182103 A2 * | 12/2013 | ............. G06F 21/00 |

OTHER PUBLICATIONS

European Search Report and Written Opinion, dated Feb. 17, 2016 for corresponding application EP13881740.
Communication Pursuant to Article 94(3) EPC, dated Mar. 14, 2017, for corresponding application EP13881740.

* cited by examiner

ENCRYPTION PROCESSING METHOD AND DEVICE FOR APPLICATION, AND TERMINAL

TECHNICAL FIELD

The present disclosure relates to the field of communication technologies, particularly to an encryption processing method and device for an application, and a terminal.

BACKGROUND

Intelligent terminals are developing rapidly in recent years. One of the most significant characteristics of an intelligent terminal is that the intelligent terminal is provided with an open operating system platform, such as an Android operating system developed by Google, and a user may download an application from a software application store based on the open platform and install the application. Currently, there are no particularly effective measures for protecting user access of an application installed in a terminal Applications having been installed in a mobile phone, and personal data information stored in these applications, such as mobile banking information and information of a QQ account, can be accessed once the mobile phone is acquired by other people. In other words, there are technical deficiencies in accessing and using an application of an intelligent terminal at present, and there is risk in using the application of the intelligent terminal.

One of the most prominent functions of an intelligent mobile terminal is to install and use an application. A large number of private information of a user is generated and stored when the user uses applications. It has become increasingly important to access data safely and it has become an extremely important new subject to improve the safety of an application and related private information thereof of the user in the intelligent mobile terminal, while there is no mature solution in the industry at present. Although a method for encrypting a TransFlash (TF) card has been provided in a related technology, the solution only implements encryption of the TF memory card, but fails to provide protection for an application and related user information thereof.

SUMMARY

The embodiments of the present disclosure provides an encryption processing method and device for an application, and a terminal to encrypt an application, so as to at least solve the problem regarding how to improve the safety of an application and related user private information thereof in an intelligent mobile terminal in a related technology.

An embodiment of the present disclosure provides an encryption processing method for an application applied to a terminal to achieve the purpose above. In the method:

a first application to be encrypted is acquired, wherein the first application to be encrypted is selected by a user of the terminal;

the user is prompted to input first information;

a first key is generated according to the first information;

the first application is encrypted by using the first key and the first key is stored in the first application.

In an example embodiment, the method further includes that an access request of the user of the terminal to request for accessing the encrypted first application is received;

the user is prompted to input second information;

the second information inputted by the user of the terminal is matched with the first key stored in the first application;

when the second information is matched with the first key successfully, the first application is decrypted and provided to the user of the terminal.

In an example embodiment, the first information is a password of a user identification card of the terminal.

In an example embodiment, the step that the first key is generated according to the first information includes that:

a request for verification of the password of the user identification card is sent to the user identification card of the terminal according to the password of the user identification card inputted by the user, to acquire a first verification result;

when the first verification result indicates that the password of the user identification card is verified successfully, the first key including a first sub-key and a second sub-key is generated, wherein the first sub-key is a terminal identification number of the terminal, and the second sub-key is the password of the user identification card of the terminal.

In an example embodiment, the second information inputted by the user of the terminal is the password of the user identification card of the terminal;

the step that the second information inputted by the user of the terminal is matched with the first key stored in the first application includes that:

the terminal identification number of the terminal is acquired and compared with the first sub-key in the first key to acquire a first comparison result;

when the first comparison result indicates that the acquired terminal identification number of the terminal is consistent with the first sub-key, the second information inputted by the user of the terminal is compared with the second sub-key in the first key to acquire a second comparison result;

when the second comparison result indicates that the second information inputted by the user of the terminal is consistent with the second sub-key, a request for verification of the password of the user identification card is sent to the user identification card of the terminal to acquire a second verification result;

the step that the first application is decrypted and provided to the user of the terminal when the second information is matched with the first key successfully includes that: when the second verification result indicates that the password of the user identification card inputted by the user of the terminal is verified successfully, the first application is decrypted and provided to the user of the terminal.

Another embodiment of the present disclosure provides an encryption processing device for an application applied to a terminal to achieve the purpose above. The device includes:

an acquiring component, configured to acquire a first application to be encrypted, wherein the first application to be encrypted is selected by a user of the terminal;

a first prompting component, configured to prompt the user to input first information;

a key generating component, configured to generate a first key according to the first information;

an encrypting component, configured to encrypt the first application by using the first key and store the first key in the first application.

In an example embodiment, the device further includes:

a receiving component, configured to receive an access request of the user of the terminal to request for accessing the encrypted first application;

a second prompting component, configured to prompt the user to input second information;

a matching component, configured to match the second information inputted by the user of the terminal with the first key stored in the first application;

a decrypting component, configured to, when the second information is matched with the first key successfully, decrypt the first application and provide the first application to the user of the terminal.

In an example embodiment, the first information is a password of a user identification card of the terminal.

In an example embodiment, the key generating component includes:

a key authentication component, configured to send a request for verification of the password of the user identification card to the user identification card of the terminal according to the password of the user identification card inputted by the user, to acquire a first verification result;

an extracting component, configured to generate, when the first verification result indicates that the password of the user identification card is verified successfully, the first key including a first sub-key and a second sub-key, wherein the first sub-key is a terminal identification number of the terminal, and the second sub-key is the password of the user identification card of the terminal.

In an example embodiment, the second information inputted by the user of the terminal is the password of the user identification card of the terminal;

the matching component includes:

a first comparing component, configured to acquire the terminal identification number of the terminal and compare the acquired terminal identification number with the first sub-key in the first key to acquire a first comparison result;

a second comparing component, configured to compare, when the first comparison result indicates that the acquired terminal identification number of the terminal is consistent with the first sub-key, the second information inputted by the user of the terminal with the second sub-key in the first key to acquire a second comparison result;

an access authentication component, configured to, when the second comparison result indicates that the password of the user identification card inputted by the terminal is consistent with the second sub-key in the first key, send a request for verification of the password of the user identification card to the user identification card of the terminal to acquire a second verification result;

the decrypting component is configured to, when the second verification result indicates that the password of the user identification card inputted by the user of the terminal is verified successfully, decrypt the first application and provide the first application to the user of the terminal.

Another embodiment of the present disclosure provides a terminal to achieve the purpose above, including any encryption processing device for an application mentioned above.

In the embodiments of the present disclosure, a user of a terminal can select to encrypt an application in the terminal, thereby enhancing the safety in accessing or using the application by the user of the terminal while improving the safety of private data of the user of the terminal and improving user experience.

DETAILED DESCRIPTION OF THE EMBODIMENTS

To make the technical problem to be solved by the embodiments of the present disclosure, technical solution and advantages more clear, detailed description will be provided hereinafter with reference to the accompanying drawings and specific embodiments.

Figure 1:
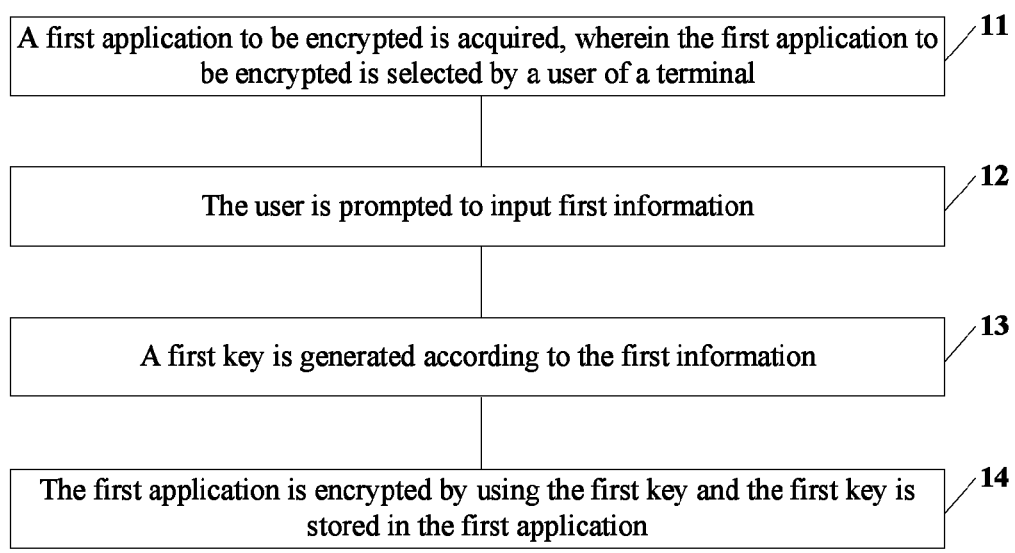
FIG. 1 is a flowchart of an encryption processing method for an application provided by an embodiment of the present disclosure.

An embodiment of the present disclosure provides an encryption processing method for an application applied to a terminal. The method is as shown in FIG. 1, including steps 11 to 14 which are described below.

Step 11: A first application to be encrypted is acquired, wherein the first application to be encrypted is selected by a user of the terminal.

Step 12: The user is prompted to input first information.

Step 13: A first key is generated according to the first information.

Step 14: The first application is encrypted by using the first key and the first key is stored in the first application.

When the user selects to encrypt a first application in the terminal, the terminal prompts the user to input the first information, generates the first key corresponding to the first application according to the first information, encrypts the first application by using the first key and stores information of the first key in a program package of the first application. By virtue of the technical solution, encryption of the application can be achieved.

There are various methods to implement an application encryption entry. In an example embodiment, the user may enter an application encryption menu through an interactive menu of the terminal and a related background program will be started according to a selecting operation on the application encryption menu so as to perform related processing.

When the user of the terminal needs to access the encrypted application, the encryption processing method for an application further includes that:

an access request of the user of the terminal to request for accessing the encrypted first application is received;

the user is prompted to input second information;

the second information inputted by the user of the terminal is matched with the first key stored in the first application;

when the second information is matched with the first key successfully, the first application is decrypted and provided to the user of the terminal.

Since the user of the terminal initiates the encryption of the application selectively, when a certain application is accessed specifically, whether the application that the user needs to access is encrypted may be judged first. If the application is encrypted, the user is prompted to input the second information, the second information is matched with the first key stored in the encrypted first application which needs to be accessed, and the first application is decrypted and provided to the user only when the second information is matched with the first key successfully; otherwise, the application is accessed directly.

In the embodiment of the present disclosure, when the user of the terminal needs to access the encrypted application, the user of the terminal can access or use the encrypted application only when the second information inputted by the user is successfully matched with a key stored in the application, thereby preventing an illegal user from accessing the application on the terminal to acquire personal data information in the application after the terminal is acquired by other illegal users, enhancing the safety in accessing or using the application by the user of the terminal while improving the safety of private data of the user of the terminal and improving user experience.

In an example embodiment, the application is encrypted by using a terminal identification number of the terminal and a password of a user identification card as a key.

The terminal identification number includes, but is not limited to an International Mobile Equipment Identity (IMEI) number, and any identification code capable of identifying a unique identify of the terminal may be used as a key for encryption. The password of the user identification card includes, but is not limited to an ADM code, a personal Identification Number (PIN) 1 code, a PIN2 code and so on.

When used as a key, the terminal identification number is extracted by the terminal directly, and the user of the terminal only needs to input the password of the user identification card to perform verification. In other words, the first information is the password of the user identification card of the terminal.

Step 13 may include that:

a request for verification of the password of the user identification card is sent to the user identification card of the terminal according to the password of the user identification card inputted by the user, to acquire a first verification result;

when the first verification result indicates that the password of the user identification card is verified successfully, the first key including a first sub-key and a second sub-key is generated, wherein the first sub-key is the terminal identification number of the terminal, and the second sub-key is the password of the user identification card of the terminal.

The user identification card herein includes, but is not limited to a Subscriber Identification Module (SIM) card, a Universal Subscriber Identification Module (USIM) card, a User Identity Module (UIM) card and so on. The application will be encrypted only after the password of the user identification card is verified successfully, thereby preventing the terminal from being used by other illegal users to lock some applications.

Accordingly, when the application is encrypted by using the terminal identification number of the terminal and the password of the user identification card as a key, the second information inputted by the user of the terminal is the password of the user identification card of the terminal if the user of the terminal needs to access or use the encrypted application.

The step that the second information inputted by the user of the terminal is matched with the first key stored in the first application includes that:

the terminal identification number of the terminal is acquired and compared with the first sub-key in the first key to acquire a first comparison result;

when the first comparison result indicates that the acquired terminal identification number of the terminal is consistent with the first sub-key, the second information inputted by the user of the terminal is compared with the second sub-key in the first key to acquire a second comparison result;

when the second comparison result indicates that the second information inputted by the user of the terminal is consistent with the second sub-key, a request for verification of the password of the user identification card is sent to the user identification card of the terminal to acquire a second verification result;

the step that the first application is decrypted and provided to the user of the terminal when the second information is matched with the first key successfully includes that: when the second verification result indicates that the password of the user identification card inputted by the user of the terminal is verified successfully, the first application is decrypted and provided to the user of the terminal.

When the user of the terminal accesses the encrypted first application, the terminal extracts the first key stored in the application from the application first, acquires the terminal identification number of the terminal, and compares the terminal identification number with the first sub-key in the first key, i.e. the terminal identification number in the first key. The user identification card will be compared only if the terminal identification number is consistent with the first sub-key; otherwise, the user is refused to access or use the application.

Further, the terminal prompts the user to input the second information, that is, the terminal prompts the user to input the password of the user identification card, and compares the second information with the second sub-key in the first key. A request for verification of the password of the user identification card will be sent to the user identification card only if the second information is consistent with the second sub-key; otherwise, the user is refused to access or use the application.

Further, the terminal sends a request for verification of the password of the user identification card to the user identification card. The user identification card herein includes, but is not limited to a SIM card, a USIM card, a UIM card and so on. The application will be decrypted and provided to the user of the terminal only after the user identification card verifies the password of the user identification card successfully.

A process of encrypting and accessing an application by using a terminal identification number and a password of a user identification card will be introduced in details below.

Figure 2:
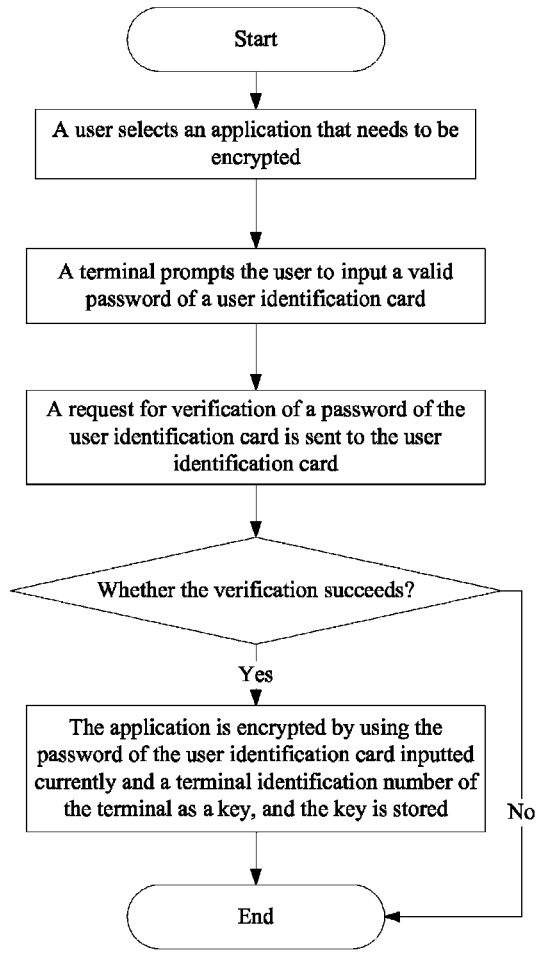
FIG. 2 is a flowchart of encrypting an application by using a terminal identification number and a password of a user identification card according to an embodiment of the present disclosure.

FIG. 2 shows an application encrypting process, including steps 1 to 4 which are described below.

Step 1: A user of a terminal selects an application that needs to be encrypted, such as a mobile bank, and the selection may be implemented through an application encryption menu of the terminal.

Step 2: The terminal prompts the user to input a valid password of a user identification card, and the password may be a PIN code of a SIM card here.

Step 3: The user sends a request to the user identification card, i.e. the SIM card herein, for verification of the PIN code. Step 4 is performed if the PIN code is verified successfully; otherwise, the encrypting process ends.

Step 4: The application, e.g. the mobile bank, is encrypted by using the password of the user identification card inputted currently and a terminal identification number of the terminal as a key, and the key is stored.

Figure 3:
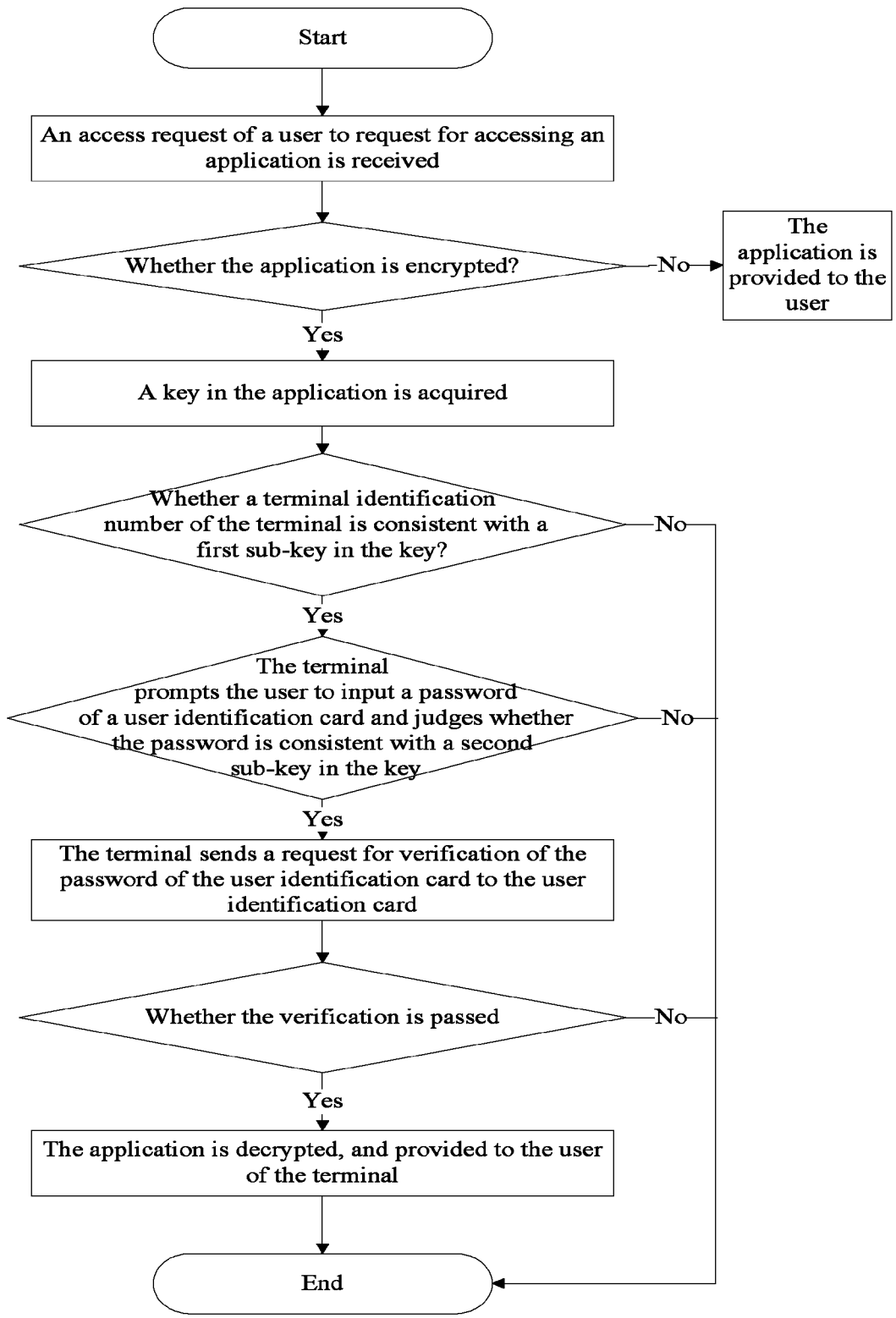
FIG. 3 is a flowchart of accessing an encrypted application according to an embodiment of the present disclosure.

When a user of a terminal needs to access or use a certain application, as shown in FIG. 3, the following steps are included.

Step 1: An access request of the user of the terminal to request for accessing the application is received.

Step 2: Whether the application is encrypted is judged, if so, Step 3 is performed; otherwise, the application is provided to the user of the terminal directly.

Step 3: A stored key is extracted from an encrypted application package. The key includes a first sub-key and a second sub-key. The first sub-key is a terminal identification number of the terminal and the second sub-key is a password of a user identification card.

Step 4: The terminal identification number of the terminal is read and compared with the first sub-key in the key, and Step 5 is performed if they are consistent; otherwise, a decryption process ends.

Step 5: The terminal prompts the user to input a valid password of the user identification card, and the password is a PIN code of a SIM card here. The terminal compares the password with the second sub-key in the key, and Step 6 is performed is they are consistent; otherwise, the decryption process ends.

Step 6: A request for verification of the password of the user identification card is sent to the user identification card, and the user identification card herein is the SIM card.

Step 7: Whether the verification is successful is judged, if so, Step 8 is performed; otherwise, the decryption process ends.

Step 8: The application is decrypted and provided to the user of the terminal.

A user of a terminal can encrypt an application in the terminal selectively through the process above. In an example embodiment, the application is encrypted by using a terminal identification number of the terminal and a password of a user identification card as a key. When the encrypted application is accessed, it is necessary to check whether a password of the user identification card inputted by the user matches the key, thereby enhancing the safety in accessing or using the application by the user of the terminal while improving the safety of private data of the user of the terminal and improving user experience.

Figure 4:
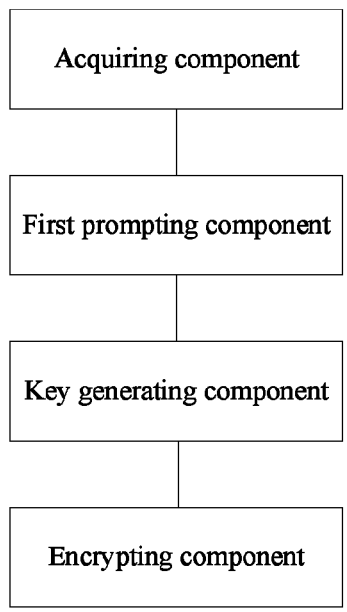
FIG. 4 is a structural diagram of an encryption processing device for an application provided by an embodiment of the present disclosure.

An embodiment of the present disclosure further provides an encryption processing device for an application applied to a terminal to achieve the purpose above. The device is as shown in FIG. 4, including:

an acquiring component, configured to acquire a first application to be encrypted, wherein the first application to be encrypted is selected by a user of the terminal;

a first prompting component, configured to prompt the user to input first information;

a key generating component, configured to generate a first key according to the first information;

an encrypting component, configured to encrypt the first application by using the first key and store the first key in the first application.

In the encryption processing device for an application, the device further includes:

a receiving component, configured to receive an access request of the user of the terminal to request for accessing the encrypted first application;

a second prompting component, configured to prompt the user to input second information;

a matching component, configured to match the second information inputted by the user of the terminal with the first key stored in the first application;

a decrypting component, configured to, when the second information is matched with the first key successfully, decrypt the first application and provide the first application to the user of the terminal.

In an example embodiment, the first information is a password of a user identification card of the terminal.

In an example embodiment, the key generating component includes:

a key authentication component, configured to send a request for verification of the password of the user identification card to the user identification card of the terminal according to the password of the user identification card inputted by the user, to acquire a first verification result;

an extracting component, configured to generate, when the first verification result indicates that the password of the user identification card is verified successfully, the first key including a first sub-key and a second sub-key, wherein the first sub-key is a terminal identification number of the terminal, and the second sub-key is the password of the user identification card of the terminal.

In an example embodiment, the second information inputted by the user of the terminal is the password of the user identification card of the terminal.

The matching component includes:

a first comparing component, configured to acquire the terminal identification number of the terminal and compare the acquired terminal identification number with the first sub-key in the first key to acquire a first comparison result;

a second comparing component, configured to compare, when the first comparison result indicates that the acquired terminal identification number of the terminal is consistent with the first sub-key, the second information inputted by the user of the terminal with the second sub-key in the first key to acquire a second comparison result;

an access authentication component, configured to send, when the second comparison result indicates that the password of the user identification card inputted by the terminal is consistent with the second sub-key in the first key, a request for verification of the password of the user identification card to the user identification card of the terminal, to acquire a second verification result;

the decrypting component is configured to, when the second verification result indicates that the password of the user identification card inputted by the user of the terminal is verified successfully, decrypt the first application and provide the first application to the user of the terminal.

Figure 5:
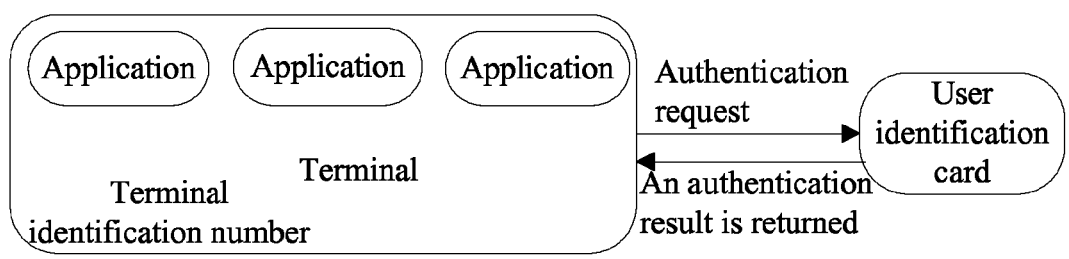
FIG. 5 is a structural diagram illustrating interaction between a terminal and a user identification card according to an embodiment of the present disclosure.
Figure 6:
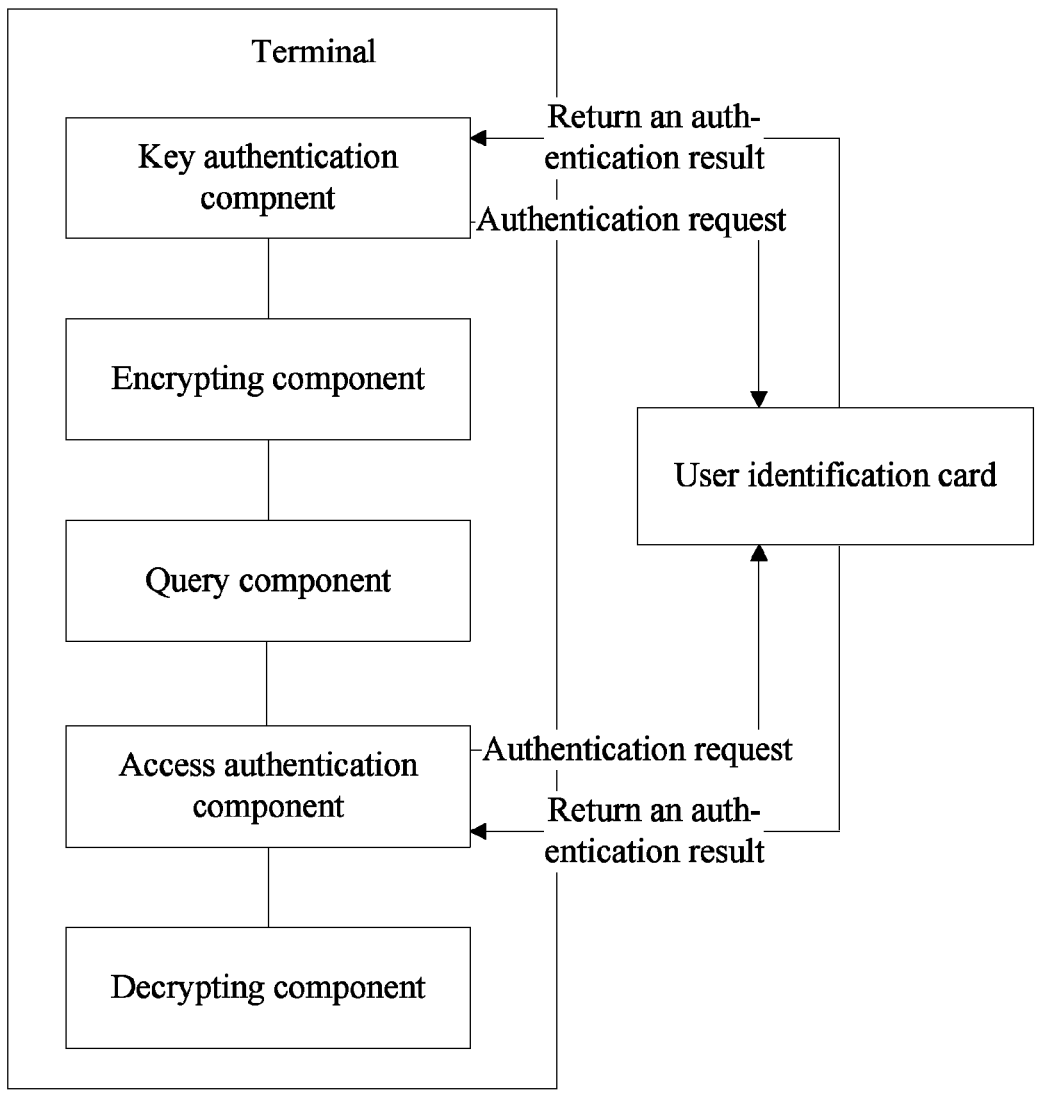
FIG. 6 is a structural diagram of a functional entity provided by an embodiment of the present disclosure.

When an application is encrypted by using a terminal identification number and a password of a user identification card, interaction between the terminal and the user identification card is as shown in FIG. 5. An embodiment of the present disclosure further provides a functional entity accordingly, as shown in FIG. 6, including:

a key authentication component, configured to send, when a user inputs a key (password) of a user identification card, a request for authentication of the key to the user identification card, receive a result indicating a success or a failure of the authentication of the user identification card, and send the key to an encrypting component if the authentication succeeds;

an encrypting component, configured to receive the key sent by the key authentication component, and use the key and a terminal identification number to encrypt data that needs to be encrypted;

a query component, configured to query, when the user accesses an application, information of an encryption state of the application, judge whether data accessed by the user has been encrypted by the encrypting component, and when determining that the data accessed by the user has been encrypted, notify an access authentication component to require the user to input the key;

an access authentication component, configured to, after receiving notification of the query component to require the user to input the key, prompt the user to input the key, and send to the user identification card a request for verification of the key inputted by the user, return the key after the user identification card verifies the key successfully, and send the key to a decrypting component;

a decrypting component, configured to receive the key sent by the access authentication component, and use the key and the identification number to perform operations including authority verification, decryption and so on to an encrypted file.

An embodiment of the present disclosure further provides a terminal to achieve the purpose above, including any encryption processing device mentioned above for an application. The terminal here may be a mobile terminal or a fixed terminal.

INDUSTRIAL APPLICABILITY

As described above, the following beneficial effect is implemented by the encryption processing method and device for an application, and the terminal provided by the embodiments of the present disclosure: a user of the terminal can encrypt an application in the terminal selectively, the application is encrypted by using a terminal identification number of the terminal and a password of a user identification card as a key, and correspondingly, it is necessary to match a password of the user identification card inputted by the user with the key when the user wants to access encrypted application, thereby enhancing the safety in accessing or using the application by the user of the terminal while improving the safety of private data of the user of the terminal and improving user experience.

The foregoing descriptions are merely example embodiments of the present disclosure. It should be pointed out that for those of ordinary skill in the art, several improvements and modifications may be also made without departing from the principle of the present disclosure. These improvements and modifications should be also regarded as the protection scope defined by the claims of the present disclosure.

What is claimed is:

1. An encryption processing method for an application, applied to a terminal, wherein the method comprises:
    acquiring a first application to be encrypted, wherein the first application to be encrypted is selected by a user of the terminal;
    prompting the user to input first information, wherein the first information is a password of a user identification card of the terminal;
    generating a first key according to the first information;
    encrypting the first application by using the first key and storing the first key in the first application;
    wherein generating the first key according to the first information comprises:
    sending a request for verification of the password of the user identification card to the user identification card of the terminal according to the password of the user identification card inputted by the user to acquire a first verification result;
    when the first verification result indicates that the password of the user identification card is verified successfully, generating the first key comprising a first sub-key and a second sub-key, wherein the first sub-key is a terminal identification number of the terminal, and the second sub-key is the password of the user identification card of the terminal.

2. The encryption processing method for an application as claimed in claim 1, further comprising:
    receiving an access request of the user of the terminal to request for accessing the encrypted first application;
    prompting the user to input second information;
    matching the second information inputted by the user of the terminal with the first key stored in the first application;
    when the second information is matched with the first key successfully, decrypting the first application, and providing the first application to the user of the terminal.

3. The encryption processing method for an application as claimed in claim 1, wherein the second information inputted by the user of the terminal is the password of the user identification card of the terminal;
    matching the second information inputted by the user of the terminal with the first key stored in the first application comprises:
    acquiring the terminal identification number of the terminal and comparing the acquired terminal identification number with the first sub-key in the first key to acquire a first comparison result;
    when the first comparison result indicates that the acquired terminal identification number of the terminal is consistent with the first sub-key, comparing the second information inputted by the user of the terminal with the second sub-key in the first key to acquire a second comparison result;
    when the second comparison result indicates that the second information inputted by the user of the terminal is consistent with the second sub-key, sending a request for verification of the password of the user identification card to the user identification card of the terminal to acquire a second verification result;
    decrypting the first application and providing the first application to the user of the terminal when the second information is matched with the first key successfully comprises: when the second verification result indicates that the password of the user identification card inputted by the user of the terminal is verified successfully, decrypting the first application and providing the first application to the user of the terminal.

4. An encryption processing device for an application, applied to a terminal, wherein the device comprises a hardware processor for executed programming components, and the programming components comprises:
    an acquiring component, configured to acquire a first application to be encrypted, wherein the first application to be encrypted is selected by a user of the terminal;
    a first prompting component, configured to prompt the user to input first information, wherein the first information is a password of a user identification card of the terminal;
    a key generating component, configured to generate a first key according to the first information;
    an encrypting component, configured to encrypt the first application by using the first key and store the first key in the first application;
    wherein the key generating component comprises:
    a key authentication component, configured to send a request for verification of the password of the user identification card to the user identification card of the terminal according to the password of the user identification card inputted by the user, to acquire a first verification result;

an extracting component, configured to generate, when the first verification result indicates that the password of the user identification card is verified successfully, the first key comprising a first sub-key and a second sub-key, wherein the first sub-key is a terminal identification number of the terminal, and the second sub-key is the password of the user identification card of the terminal.

5. The encryption processing device for an application as claimed in claim 4, the programming component further comprising:
a receiving component, configured to receive an access request of the user of the terminal to request for accessing the encrypted first application;
a second prompting component, configured to prompt the user to input second information;
a matching component, configured to match the second information inputted by the user of the terminal with the first key stored in the first application;
a decrypting component, configured to, when the second information is matched with the first key successfully, decrypt the first application and provide the first application to the user of the terminal.

6. The encryption processing device for an application as claimed in claim 4, wherein the second information inputted by the user of the terminal is the password of the user identification card of the terminal;
the matching component comprises:
a first comparing component, configured to acquire the terminal identification number of the terminal and compare the acquired terminal identification number with the first sub-key in the first key to acquire a first comparison result;
a second comparing component, configured to compare, when the first comparison result indicates that the acquired terminal identification number of the terminal is consistent with the first sub-key, the second information inputted by the user of the terminal with the second sub-key in the first key to acquire a second comparison result;
an access authentication component, configured to send, when the second comparison result indicates that the password of the user identification card inputted by the terminal is consistent with the second sub-key in the first key, a request for verification of the password of the user identification card to the user identification card of the terminal to acquire a second verification result;
the decrypting component is configured to, when the second verification result indicates that the password of the user identification card inputted by the user of the terminal is verified successfully, decrypt the first application and provide the first application to the user of the terminal.

7. A terminal, comprising the encryption processing device for an application according to claim 4.

8. A terminal, comprising the encryption processing device for an application according to claim 5.

* * * * *